UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

AZO DYE.

SPECIFICATION forming part of Letters Patent No. 417,295, dated December 17, 1889.

Application filed September 11, 1889. Serial No. 323,607. (Specimens.)

*To all whom it may concern:*

Be it known that I, MORITZ ULRICH, doctor of philosophy, residing at Elberfeld, in the Empire of Germany, assignor to the FARBENFABRIKEN, VORMALS FR. BAYER & CO., at Elberfeld, have invented a new and useful Improvement in the Manufacture of Dye-Stuffs or Coloring-Matter, of which the following is a specification.

My invention relates to the production of a new blue azo color for dyeing unmordanted cotton, wool, and silk by the action of tetrazo-diphenyl salts upon the dioxynaphthaline monosulpho-acid gained by melting the so-called "alpha-naphthol alpha-disulpho-acid S" described in the German patent, No. 40,571, of the Schöllkopf Aniline and Chemical Company, in Buffalo, with caustic alkali.

In carrying out my process practically I proceed as follows: Twenty-eight kilos of benzidine sulphate suspended in water containing forty-two kilos muriatic acid of the gravity of 1.161 are, with fourteen kilos sodium nitrite, in the well-known manner, converted into the tetrazo compound. The so-formed tetrazo-diphenyl is then allowed to run slowly, under continuous stirring, into an alkaline solution of fifty kilos of the dioxynaphthaline monosulpho-acid produced by melting alpha-naphthol alpha-disulpho-acid S with caustic alkali. A blue precipitate forms, which, after adding salt, is filtered and dried.

My new dye-stuff forms a black powder and dissolves very easily in water with violet color, which solution is turned red by adding caustic alkali. With concentrated sulphuric acid it gives a deep-blue solution and dyes cotton in a boiling soap bath a clear blue, which is more reddish blue than the dye-stuff gained from the same dioxynaphthaline sulpho-acid and tetrazo-ditolyl. It has the following chemical formula:

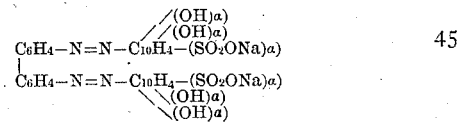

What I claim as my invention, and desire to secure by Letters Patent, is—

The coloring-matter herein described, which is produced by the action of tetrazo-diphenyl salts from benzidine upon the dioxynaphthaline monosulpho-acid obtained by melting the so-called "alpha-naphthol alpha-disulpho-acid S" with caustic alkali, and which forms a black powder easily soluble in water with violet color, soluble in concentrated sulphuric acid with deep-blue color; by adding caustic alkali to the watery solution the violet is turned to red, and which dyes unmordanted cotton in a soap bath a clear reddish blue fast to soap and mineral acid.

In testimony whereof I have signed my name in presence of two subscribing witnesses.

MORITZ ULRICH.

Witnesses:
CARL DUISBERG,
KARL KREKELER.